United States Patent
Lewis et al.

(10) Patent No.: US 10,321,194 B2
(45) Date of Patent: Jun. 11, 2019

(54) LIVESTREAM CONVERSATION NOTIFICATIONS

(71) Applicant: Google Inc., Mountain View, CA (US)

(72) Inventors: Justin Lewis, Marina Del Rey, CA (US); Joseph Cohen, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/838,173

(22) Filed: Dec. 11, 2017

(65) Prior Publication Data

US 2018/0167688 A1  Jun. 14, 2018

Related U.S. Application Data

(63) Continuation of application No. 15/449,499, filed on Mar. 3, 2017, now Pat. No. 9,872,076.

(60) Provisional application No. 62/495,611, filed on Dec. 9, 2016.

(51) Int. Cl.
| | |
|---|---|
| *H04N 21/24* | (2011.01) |
| *H04N 21/258* | (2011.01) |
| *H04N 21/431* | (2011.01) |
| *H04N 21/4788* | (2011.01) |
| *H04N 21/2187* | (2011.01) |
| *H04N 21/488* | (2011.01) |
| *G06F 16/78* | (2019.01) |
| *H04N 21/442* | (2011.01) |

(52) U.S. Cl.
CPC ......... *H04N 21/4788* (2013.01); *G06F 16/78* (2019.01); *H04N 21/2187* (2013.01); *H04N 21/44213* (2013.01); *H04N 21/4882* (2013.01)

(58) Field of Classification Search
CPC ............. H04N 21/2408; H04N 21/258; H04N 21/25866; H04N 21/431
USPC ............................................... 725/9, 50, 105
See application file for complete search history.

(56) References Cited

U.S. PATENT DOCUMENTS

| | | | |
|---|---|---|---|
| 8,555,177 B1 | 10/2013 | Junee et al. | |
| 9,301,016 B2 | 3/2016 | Archibong et al. | |
| 2011/0288912 A1 | 11/2011 | McCrea et al. | |
| 2013/0046770 A1* | 2/2013 | Tseng | G06F 17/30867 707/748 |
| 2014/0059132 A1 | 2/2014 | Shelton et al. | |

(Continued)

FOREIGN PATENT DOCUMENTS

WO     2016/140875 A1    9/2016

OTHER PUBLICATIONS

Jarboe, Greg, "Periscope, Facebook Live, and Youtube Mobile Live Streaming, Oh My!" Jul. 18, 2016, p. 5 of 13, http://tubularinsights. com/perscope-facebook-live-youtube-mobile-live-streaming/.

(Continued)

*Primary Examiner* — Dominic D Saltarelli
(74) *Attorney, Agent, or Firm* — Lowenstein Sandler LLP

(57) ABSTRACT

Implementations disclose livestream conversation notifications. A method includes receiving, via a first user device over a network, a livestream video; presenting, via the first user device to a first user, the livestream video; selecting a second user with whom the livestream video is to be shared, the selecting being based on relevance of content of the livestream video to the second user; and causing a transmission, to a second user device of the second user, of a notification that at least the first user is watching the livestream video.

20 Claims, 7 Drawing Sheets

(56) References Cited

U.S. PATENT DOCUMENTS

| | | |
|---|---|---|
| 2014/0214983 A1 | 7/2014 | Hossack |
| 2014/0330896 A1* | 11/2014 | Addala ............... G06F 17/3089 709/203 |
| 2016/0011845 A1 | 1/2016 | Kuchoor |
| 2016/0260296 A1* | 9/2016 | Shirriff .................... G08B 5/22 |
| 2016/0277802 A1 | 9/2016 | Bernstein et al. |
| 2017/0048495 A1* | 2/2017 | Scalisi ................ H04L 12/2818 |
| 2017/0149714 A1* | 5/2017 | Valdivia .................. H04L 51/16 |
| 2018/0014053 A1* | 1/2018 | Venkatraman ....... H04N 21/231 |

OTHER PUBLICATIONS

International Search Report and Written Opinion dated Feb. 13, 2018, on application No. PCT/US2017/054156.
Written Opinion of the International Preliminary Examining Authority dated Aug. 27, 2018, on application No. PCT/US2017/054156.

\* cited by examiner

LIVESTREAM CONVERSATION NOTIFICATIONS

CROSS-REFERENCE TO RELATED APPLICATION

This application is a continuation application of U.S. Ser. No. 15/449,499, filed Mar. 3, 2017, which claims the benefit of U.S. Provisional Application No. 62/495,611, filed on Dec. 9, 2016, the entire contents of both are hereby incorporated by reference.

TECHNICAL FIELD

This disclosure relates to the field of livestream videos and, in particular, to livestream video notifications.

BACKGROUND

Livestream videos (e.g., a live video of an event) are streamed through applications ("apps") and websites (e.g., the Rio Olympics were streamed in the United States through NBC apps). It is difficult for a user to watch a livestream video with other users that are not in the same room. This results in loss of interest by users in watching livestream videos.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, via a first user device over a network, a livestream video, presenting, via the first user device to a first user, the livestream video, selecting, from contacts of the first user, a set of contacts with whom the livestream video is to be shared, the selecting being based on affinity scores of the contacts, and causing a transmission, to the selected set of contacts, of a notification that at least the first user is watching the livestream video.

In one implementation, an affinity score may indicate how relevant the livestream video is for a corresponding contact of the contacts based on a relationship between the corresponding contact and the first user. The relationship may be based on whether the corresponding contact and the first user are participants in a text conversation, where the transmission of the notification is via the text conversation. An affinity score may indicate how relevant the livestream video is for a corresponding contact of the contacts based on content of the livestream video. An affinity score may indicate how relevant the livestream video is for a corresponding contact of the contacts based on whether the corresponding contact is viewing the livestream video. An affinity score may indicate how relevant the livestream video is for a corresponding contact of the contacts based on whether the corresponding contact is online. The causing of the transmission of the notification may be after the first user has watched the livestream video for a threshold amount of time. One or more affinity scores may indicate how relevant the livestream video is for a corresponding contact of the contacts, the one or more affinity scores may be represented by a binary values, and the binary values may be combined into a score and compared against a threshold value to determine how relevant the livestream video is for the corresponding contact.

In a further aspect of the disclosure, a non-transitory machine-readable storage medium storing instructions which, when executed cause a processing device to perform operations including transmitting, over a network, a livestream video to a first user device to cause the livestream video to be presented, via the first user device, to a first user, selecting, from contacts of the first user, a set of contacts with whom the livestream video is to be shared, the selecting being based on affinity scores of the contacts, and causing a transmission, to the selected set of contacts, of a notification that at least the first user is watching the livestream video.

In one implementation, wherein an affinity score indicates how relevant the livestream video is for a corresponding user based on a relationship between the corresponding user and the first user. In one implementation, wherein the relationship is based on whether the corresponding user and the first user are participants in a text conversation, wherein the notification is to be provided as part of the text conversation. In one implementation, wherein an affinity score indicates how relevant the livestream video is for a corresponding user based on one or more of: relevance of the livestream video to the corresponding user; whether the corresponding user is viewing the livestream video; or whether the corresponding user is online. In one implementation, the operations further comprise determining the first user has watched the livestream video for a threshold amount of time, wherein the notification is caused to be transmitted subsequent to the determining the first user has watched the livestream video for the threshold amount of time.

In one implementation, the operations further include responsive to ceasing from presenting the livestream video to the first user and subsequently presenting the livestream video to the first user within a threshold amount of time of the ceasing, refraining from providing, to the selected set of contacts, an additional notification that the at least the first user is watching the livestream video. In one implementation, the operations may further include transmitting, over the network, the livestream video to a second user device to cause the livestream video to be presented, via the second user device, to a second user, selecting, from a second contacts of the second user, a third user with whom the livestream video is to be shared, the selecting being based on second affinity scores of the third user, where the third user is one of the selected set of contacts to whom the notification was previously provided, invalidating the notification provided to the third user, deduping the notification with a second notification that the second user is watching the livestream video, and providing, to the third user, the deduped notification that the first user and the second user are watching the livestream video. In one implementation, the operations may further include storing a record of transmitted notifications including the notification, determining a subset of the transmitted notifications that were transmitted to a third user within a threshold amount of time and that correspond to one or more of the livestream video, the first user, or a text conversation corresponding to the notification, determining a new notification is to be transmitted to the third user, the new notification corresponding to the one or more of the livestream video, the first user, or the text conversation corresponding to the notification, combining the subset of the transmitted notifications with the new notification to generate an updated notification, determining the user has not dismissed the notification and has not already engaged with a similar notification, and providing, to the selected set of contacts, the updated notification. In another implementation, the operations may further include determining the livestream video has ceased from being presented to the first user for more than a threshold amount of time, and providing a push notification to the selected set of contacts, where the push notification invalidates a previous notification state of the selected set of contacts and causes a new notification state to be displayed on respective user devices of the selected set of contacts, where the push notification includes a timestamp.

In another aspect of the disclosure, a method includes presenting a livestream video hosted by a first platform to a first user, determining that the first user is in a text conversation with a second user via a second platform, causing a notification that at least the first user is watching the livestream video to be sent to the second user, where the notification is an invitation to watch the livestream video, upon receiving an indication that the second user has accepted the invitation, causing the livestream video to be presented to the second user on a user interface of the first platform, and causing the text conversation between the first user and the second user to be continued on the user interface of the first platform.

In one implementation, the causing of the text conversation to be continued on the user interface of the first platform may include obtaining contents of the text conversation via an application program interface (API) with the second platform. The causing of the text conversation to be continued on the user interface of the first platform may include obtaining contents of the text conversation via an operating system (OS) of a user device of the first user.

BRIEF DESCRIPTION OF THE DRAWINGS

The present disclosure is illustrated by way of example, and not by way of limitation, in the figures of the accompanying drawings.

DETAILED DESCRIPTION

Figure 1:
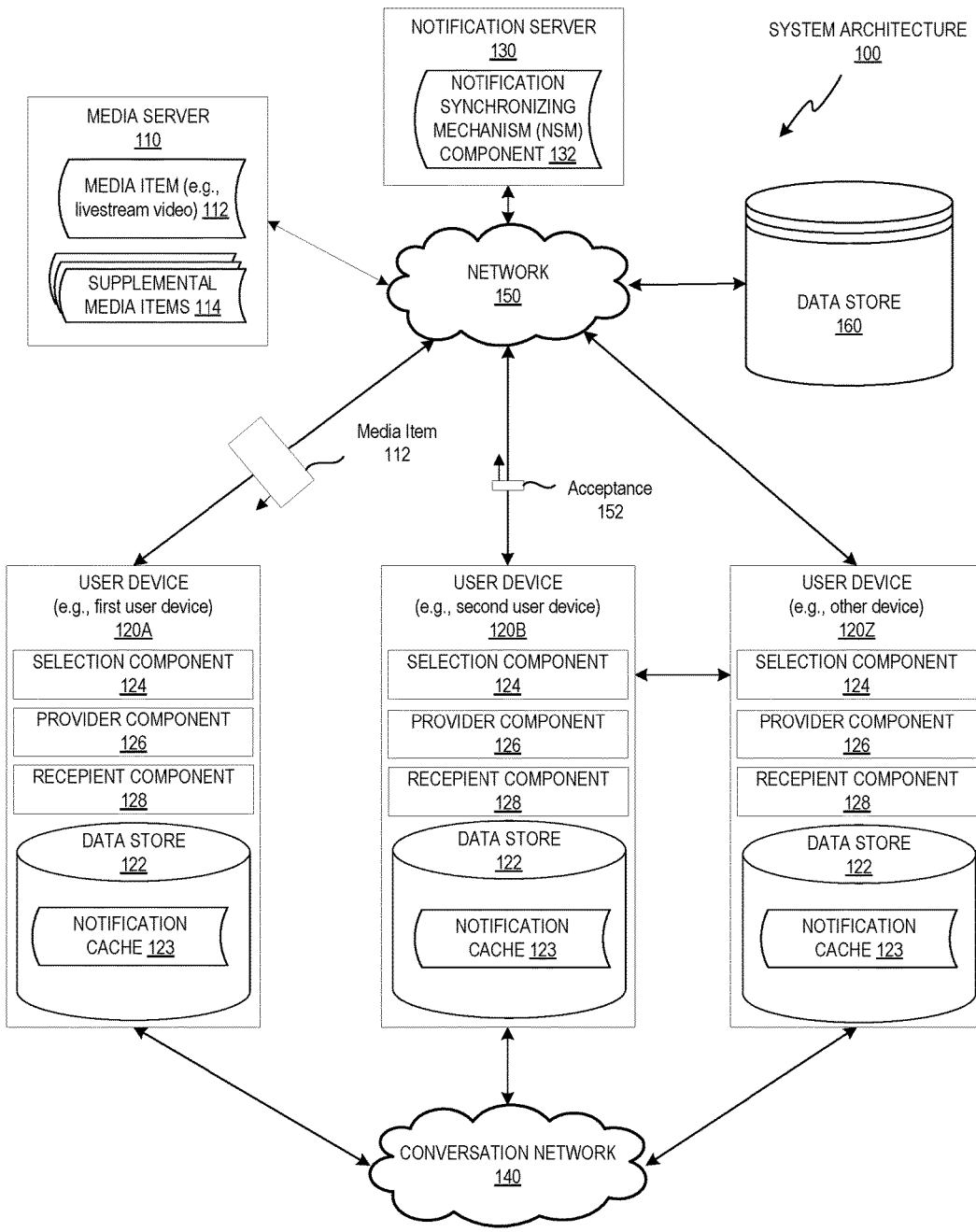
FIG. 1 is a block diagram illustrating an exemplary system architecture, in accordance with an implementation of the disclosure.

Aspects and implementations of the disclosure are directed to livestream video notifications. Online videos can be searched for and presented on a user device. Online videos are traditionally recommended to a first user according to videos in a watch page (e.g., a page that displays what videos have been watched by a user, a page that displays how many times a video has been watched by users, etc.) of one or more other users (e.g., contacts of the first user, users that have expressed similar interests or have watched similar videos as the first user, etc.) or user watch history of the one or more other users. The majority of online videos that are recommended are non-live videos which have been watched by one or more users. A live video (also known as a livestream video) refers to a live broadcast or transmission of a live event, where the video is concurrently transmitted as the event occurs. Livestream videos are streamed for a limited period of time (e.g., the duration of the live event). Livestream videos may be relevant, but they may not fit well into viral ecosystems of the sharing economy (e.g., a user sharing media items with other users). Users often only share videos after the users have watched the videos, so the ephemeral nature of livestream videos causes livestream videos to not be shared. Livestream videos drive very little traffic when shared to third party social networks because the social networks do not syndicate the livestream video fast enough. In traditional systems, livestream videos are difficult to watch together with contacts that are not in the same room (e.g., in a house or office), resulting in much of the excitement of the livestream video being lost. Traditionally, watching a livestream video is not a social experience (e.g., traditionally co-watching the livestream video is limited to users that are using the same user device), which decreases watch times of livestream videos and decreases the adoption of livestream videos overall.

Aspects of the present disclosure address the above and other deficiencies by providing livestream video notifications to contacts of a user currently watching the livestream video. In one example, a media server may provide media items to a user device of a first user ("first user device") and may transmit a notification that the first user is watching the livestream video to a user device of a second user ("second user device"). In another example, the media server may provide media items to a first user device and the first user device may transmit a notification that the first user is watching the livestream video to a second user device. The user devices may be mobile devices (e.g., phone, tablet, laptop, smart watch, etc.), a laptop, a desktop, a smart television, etc. and may be capable of presenting media items and notifications to a user and transmitting a notification or causing a notification to be transmitted to one or more other user devices.

In one example, the first user device receives a livestream video over a network (e.g., over the Internet) from the media server. The first user device presents the livestream video to a first user. The first user device may select, from contacts of the first user, a set of contacts with whom the livestream video is to be shared (e.g., based on affinity scores of the contacts). The first user device may cause transmission of a notification (e.g., via the media server) that at least the first user is watching the livestream video to the selected set of contacts.

In some implementations, notifications that are being sent to each of the selected contacts are combined and/or deduped (e.g., by removing duplicate notifications from the notifications sent to each selected contact) using, for example, a notification synchronizing mechanism (NSM) that manages notifications to be transmitted to individual user devices. For example, once a user's contact has been provided with a notification about the user watching a livestream video, the contact will not be notified again if the user stops watching the livestream video and then returns to watching the livestream video. In another example, if multiple contacts of a user watch the same livestream video, the user is provided with only one notification identifying all of the contacts watching that livestream video.

In some implementations, a livestream video can be presented to a user by a content sharing platform while the user is in a text conversation with his or her contact via another platform (e.g., a mobile messaging platform). A notification can be sent to the contact with an invitation to watch the livestream video, and if the contact accepts the invitation, the livestream video can be presented to the contact on a user interface of the content sharing platform, and the text conversation between the user and the contact can be continued on the user interface of the content sharing platform.

The technology disclosed herein is advantageous because it facilitates livestream video virality (e.g., a livestream video going viral, multiple users watching a livestream video at the same time), improves social offerings of a livestream videos (e.g., increase the social aspect of livestream videos) and increases the number of users who watch a livestream video. By providing notifications and enabling online conversations between users that are watching a livestream video, the technology disclosed herein also provides a more enjoyable and engaging experience for viewers of livestream videos, thereby encouraging users to watch more livestream videos and to watch the livestream videos for more time. Furthermore, by intelligently selecting a subset of a user's contacts who should receive a notification about a livestream video and by combining/deduping notifications that are being sent to individual users, the technology disclosed herein ensures that the resulting notifications are relevant and not overwhelming, thereby improving the overall user experience with platforms providing livestream videos. Implementations of the disclosure often reference videos for simplicity and brevity. However, the teaching of the present disclosure are applied to media items generally and can be applied to various types of content or media items, including for example, video, audio, text, images, program instructions, etc. The content or media items may be livestream content or livestream media items, including for example, livestream video, livestream audio, livestream text, livestream images, livestream program instructions, etc.

FIG. 1 illustrates an example system architecture 100, in accordance with one implementation of the disclosure. The system architecture 100 includes media server 110, user devices 120A-Z, a network 150, and a data store 160.

Media server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. Media server 110 may be a part of a content sharing platform that may allow users to consume, upload, share, search for, approve of ("like"), dislike, and/or comment on media items including livestream videos. The content sharing platform may also include a website (e.g., a webpage) or application back-end software that may be used to provide a user with access to the media items.

Media server 110 may host content, such as media items 112 and supplemental media items 114. Media items 112 and supplemental media items 114 may be digital content chosen by a user, digital content made available by a user, digital content uploaded by a user, digital content chosen by a content provider, digital content chosen by a broadcaster, livestream digital content, etc. Examples of media items 112 and supplemental media items 114 include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

Media items 112 and supplemental media items 114 may be consumed via the Internet and/or via a mobile device application. For brevity and simplicity, an online livestream video (also hereinafter referred to as a livestream video) is used as an example of a media item 112 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform may store the media items 112 using the data store 160. In one example, media item 112 may be a livestream video presented to a user of user device 120A and supplemental media item 114 may be an advertisement selected by media server 110 to be presented before, during or after presenting media item 112 on one or more of the user devices 120A-Z.

User devices 120A-Z may each include computing devices such as personal computers (PCs), laptops, mobile phones, smart phones, tablet computers, netbook computers, network-connected televisions, etc. In some implementations, user devices 120A-Z may also be referred to as "user devices." User devices 120A-Z may be capable of receiving media items 112 from media server 110 over a network 150 and may be capable of causing notifications that the user is watching a media item 112 to be transmitted to other user devices via a conversation network 140, a network 150, or a combination thereof.

Conversation network 140 may be a computing network that provides one or more communication channels between user devices 120A-Z. In one example, conversation network 140 may be a peer-to-peer network that does not rely on a pre-existing network infrastructure (e.g., access points, switches, routers) and the user devices A-Z may replace the networking infrastructure to route communications between the user devices. Conversation network 140 may be a wireless network that is self-configuring and enables user devices 120A-Z to contribute to conversation network 140 and dynamically connect and disconnect from conversation network 140 (e.g., ad hoc wireless network). In another example, conversation network 140 may be a computing network that includes networking infrastructure that enables user devices to communicate with other user devices. In the latter example, conversation network 140 may or may not have access to the public network (e.g., internet). For example, a vehicle (e.g., bus, train) or location (e.g., classroom, library, café, etc.) may provide an access point or user device that may function as an access point to enable user devices to communicate with one another without providing internet access. Alternatively, the conversation network 140 may provide access to a larger network such as network 150 (e.g., Internet). In one implementation, conversation network 140 may be based on any wireless or wired communication technology and may connect a first user device directly or indirectly (e.g., involving an intermediate user device) to a second user device. The wireless communication technology may include Bluetooth®, Wifi®, infrared, ultrasonic or other technology. The wired communication may include universal serial bus (USB), ethernet, RS 232, or other wired connection. The conversation network 140 may be an individual connection between two devices or may include multiple connections.

Network 150 may be a public network that provides one or more of user devices 120A-Z with access to media server 110 and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

In some implementations, system architecture 100 may also include a notification server 130 coupled to user devices 120A-120Z via network 150 provide notifications to user devices 120A-120Z. Notification server 130 may be part of the content sharing platform and/or media server 110 or may be an independent platform including one or more computing devices such as a rackmount server, a router computer, a server computer, a personal computer, a mainframe computer, a laptop computer, a tablet computer, a desktop computer, etc. Notification server 130 may include a NSM component 132 that is responsible for combining and/or deduping notifications to be sent to user devices 120A-120Z as described in more detail herein.

Each of user devices 120A-Z may include a media viewer that allows users to view media items 112, conversation messages (e.g., text messages or chat messages), and/or notifications that are transmitted over conversation network 140 and/or network 150. The media viewer may present images, videos, audio, web pages, documents, etc. In one example, the media viewer may be a web browser that can access, retrieve, present, and/or navigate content (e.g., web pages such as Hyper Text Markup Language (HTML) pages, digital media items, text conversations, notifications, etc.) served by a web server. The media viewer may render, display, and/or present the content to a user. The media viewer may also display an embedded media player (e.g., a Flash® player or an HTML5 player) that is embedded in a web page (e.g., a web page that may provide information about a product sold by an online merchant). In another example, the media viewer may be a standalone application (e.g., a mobile application or app) that allows users to view digital media items (e.g., digital videos, digital images, electronic books, etc.), to participate in text conversations, and to receive notifications.

According to aspects of the disclosure, the media viewer may allow users to watch content, participate in a conversation, and share, record, edit, and/or upload livestream content to the content sharing platform. The media viewer may be provided to user devices 120A-Z by media server 110 or a content sharing platform. For example, the media viewer may be an embedded media player (as well as other components) included in web pages provided by the content sharing platform. In another example, the media viewer may be an application that is provided by the content sharing platform and is installed and executed on user device 120A-Z.

In the example shown in FIG. 1, each user device may include a selection component 124, a provider component 126, a recipient component 128, and a data store 122.

Data store 122 may be a memory (e.g., random access memory), a drive (e.g., a hard drive, a flash drive), a database system, or another type of component or device capable of storing data. Data store 122 may include multiple storage components (e.g., multiple drives or multiple databases) that may span multiple computing devices (e.g., multiple server computers). Data store 122 may include a notification cache 123 that stores copies of notifications that are received from the media server 110 or a user device 120A-120Z. In one example, each notification may be a file that is received from media server 110 or a user device 120A-120Z and may be stored locally in notification cache 123. In another example, each notification may be transmitted from notification server 130 or a user device 120A-120Z and may exist as an ephemeral copy in memory of a user device until it is off-lined. Off-lining refers to a user device storing an ephemeral copy of the notification in persistent data storage of the user device. This may enable the user device to access the notification at a later point in time (e.g., after a reboot) without using an internet connection. In one example, the notification may be transmitted by the user device to itself when presenting the notification. In one example, a user device may off-line a notification item by copying one or more notifications to the persistent data storage.

Selection component 124 may include functionality to select one or more users (e.g., a set of contacts of the contacts of the user) with whom the livestream video is to be shared. Selection component 124 may determine one or more users that are participants in a conversation with the user. Selection component 124 may provide a conversation between the user and the selected one or more users.

Provider component 126 may include functionality that enables the user device to cause notifications to be transmitted to one or more other user devices.

Recipient component 128 may include functionality that enables the user device to receive media items and notifications. Recipient component 128 may receive a notification (e.g., an invitation to watch a livestream video) from the media server 110 or a user device 120A-120Z. Recipient component 128 may transmit an acceptance 152 of the notification (e.g., the invitation) to the media server 110. Recipient component 128 may receive the media item 112 (e.g., the livestream video) subsequent to transmitting the acceptance 152.

In general, functions described in one implementation as being performed by the media server 110 and/or notification server 130 can also be performed on the user devices 120A through 120Z in other implementations, if appropriate. In addition, the functionality attributed to a particular component can be performed by different or multiple components operating together. The content sharing platform, media server 110 and notification server 130 can also be accessed as a service provided to other systems or devices through appropriate application programming interfaces, and thus is not limited to use in websites.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the content sharing platform.

Although implementations of the disclosure are discussed in terms of a media server and a content sharing platform, implementations may also be generally applied to any type of social network providing digital content and connections between users.

In situations in which the systems discussed here collect personal information about users, or may make use of personal information, the users may be provided with an opportunity to control whether the content sharing platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform. In another example, a notification that the user is watching a livestream video may only be transmitted to participants in the same conversation as the user. In another example, the user may select to which users the user wants to send notifications and notifications will only be sent to those users. Thus, the user may have control over with whom notifications of livestream videos the user is watching are shared.

Figure 2:
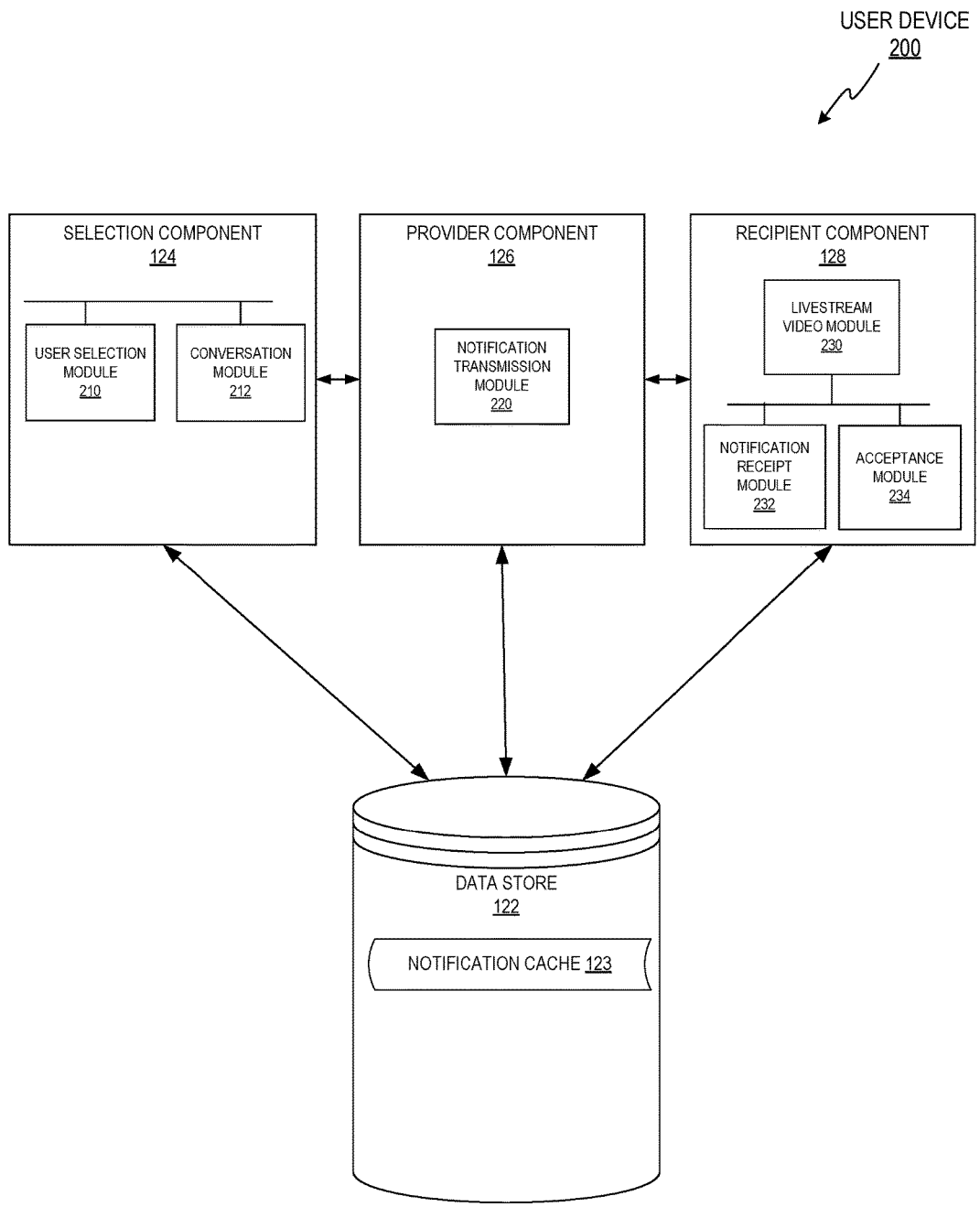
FIG. 2 is a block diagram illustrating the components and modules of an example user device, in accordance with an implementation of the disclosure.

FIG. 2 is a block diagram illustrating an example user device 200. User device 200 may be the same or similar to user devices 120A-Z. In the example shown in FIG. 2, user device 200 includes a selection component 124, provider component 126, recipient component 128, and data store 122.

Selection component 124 may include a user selection module 210. In one implementation, the selection component 124 includes a conversation module 212.

User selection module 210 may select a set of contacts with whom the livestream video is to be shared from contacts of the user. The contacts of the user may include one or more of phone contacts of the user, email contacts of the user (e.g., contacts the user has emailed, contacts that have emailed the user, etc.), connections of a user on a social network (e.g., friends, followers, connections, links, contacts in a circle of the user, etc.), participants in a conversation (e.g., a text conversation, a video conversation, etc.) with the user, etc. A contacts graph may be built from seeds (e.g., phone, email, social network, and/or conversation contacts of the user) and used for selecting the set of contacts. The set of contacts may be selected based on affinity scores of the contacts. An affinity score may indicate how relevant the livestream video is for a corresponding contact of the contacts. The affinity score may be based on one or more of a relationship between the corresponding contact and the user (e.g., whether the corresponding contact and the user are participants in a text conversation, whether the corresponding contact and the user have corresponded within a threshold amount of time or for a threshold frequency of times), content of the livestream video (e.g., an attribute between the corresponding contact and the content, if the corresponding contact has watched media items with similar content, whether the corresponding contact has expressed approval or dislike of similar content or media items with similar content, whether the corresponding contact has commented on media items of similar content, relevance of the livestream video to the corresponding user, etc.), whether the corresponding contact is viewing the livestream video, or whether the corresponding contact is online. An affinity score may be represented by a binary value. For example, a requirement for a notification to be sent to a client device of a corresponding contact may be that the corresponding contact and the user must be contacts and the content of the livestream device must be shared in a conversation between the corresponding contact and the first user. These two binary attributes can be combined into a score with a strict threshold requiring both to be true.

User selection module 210 may display the contacts (e.g., the selected set of contacts) in a graphical interface, which may be capable of receiving user input to select one or more of the contacts. In another example, if a user is watching a livestream video in a group conversation, then a notification may be sent to all of the participants in the conversation because the participants have both a high affinity score for the user (since participants and the user are in the same group conversation) and because the participants have a high affinity score for the content of the livestream video (since the livestream video was posted in the conversation that the participants and the user are participating).

Conversation module 212 may communicate with user selection module 210. Conversation module 212 may enable a conversation between the user of user device 200 and one or more of the contacts of the user (e.g., the selected set of contacts selected by user selection module 210). In one implementation, the conversation module 212 may initiate the conversation between the user and the one or more contacts prior to the user selection module 210 selecting the set of contacts. In another implementation, the conversation module 212 may initiate a conversation between the user and the selected set of contacts after the user selection module 210 selects the set of contacts. The conversation may be one or more of a social chatroom, an online chat, a text conversation, a video conversation, etc. The conversation module 212 may display a text conversation in a graphical interface, which may be capable of receiving user input of text, URLs, and other content. The conversation module 212 may push user input from user device 200 to the conversation. The conversation module 212 may pull user input from other users (e.g., users of user devices 120A-120Z, contacts of user device 200, other participants of the conversation, etc.) for the conversation.

Selection component 124 may function in multiple modes including a one-on-one mode, a public mode, and a private mode. The one-on-one mode may be similar to the push and pull features discussed above and may involve the user device 200 receiving user input from another user.

The public mode may be similar to the one-on-one mode in that user device 200 may receive user input from another user, but when the public mode is enabled there may be multiple user devices. Some or all of the selected set of contacts may participate in the conversation. User device 200 may then select one or more of the users without selecting a specific user device. In this example, the user device that is participating in the conversation may remain anonymous to user device 200. Conversely, user device 200 may participate in the conversation anonymously. In public mode, the conversation may be a public conversation so that users who are not participants in the conversation may see what livestream videos each other are watching or users who are not contacts of the user may participate in the conversation.

The private mode may be similar to the one-on-one mode and the public mode but may include an approval stage. During the approval stage, the user device that is participating in the conversation may receive a request to participate in the conversation from another user and may approve or disapprove participation in the conversation. In one example, the approval or disapproval may be based on user input, in which case the user selection module 210 may notify the user and the user may provide input that approves or disapproves the sharing. In private mode, the conversation may be a private conversation so that only the participants in the conversation see what livestream videos each other are watching.

After selection component 124 has selected a set of contacts, the selection component 124 may interact with provider component 126 or recipient component 128. In one implementation, after selection component has selected the set of contacts and is providing a conversation between the user and the selected set of contacts, the selection component 124 may interact with provider component 126 or recipient component 128. Provider component 126 may be used when user device 200 is transmitting a notification to another user and recipient component 128 may be used when user device 200 is receiving a notification from another user. In one implementation, the provider component 126 transmits a notification and the recipient component 128 receives a notification without a conversation being established between the user device 200 and the selected set of contacts.

Provider component 126 may include a notification transmission module 220. Notification transmission module 220 may cause a notification to be transmitted to one or more of the set of contacts selected by the user selection module 210. The notification may be one or more of a push notification, a mobile native notification, a text message, a desktop notification, an email, an alert, a text conversation, a URL in a conversation, etc. The notification may be transmitted via the conversation if the user and the one or more selected set of contacts are in the conversation. The notification may indicate that the user of the user device 200 is watching the livestream video (e.g., the user device 200 is presenting the livestream video to the user). The notification may be an invitation to watch the livestream video. The notification transmission module 220 may determine the user has watched the livestream video for a threshold amount of time (e.g., 10-30 seconds) prior to causing the transmission of the notification so that there is a greater chance that the user is going to continue watching the livestream video than if the user had been watching the livestream video for less than the threshold amount of time. Notification transmission module 220 may cause a notification referencing a livestream video to be automatically transmitted to the selected set of contacts in response to the user initiating watching of the livestream video.

Once a notification has been transmitted, the notification transmission module 220 may cause an additional notification not to be transmitted if the user stops watching the livestream video and resumes watching the livestream video within a threshold amount of time. Some livestream videos have a long duration (e.g., livestream videos of video game competitions (e.g., eSports tournaments), livestream videos of walkthrough or playthrough of a video game (e.g., Let's Plays (LPs), etc.), the Olympics, etc.). A notification may be resent to a corresponding contact if the user stops watching the livestream video and the user resumes watching the livestream video more than a threshold period of time (e.g., a few hours) after stopping watching.

In one implementation, the notification transmission module 220 may transmit the notification to a user device 120A-120Z. In another implementation, the notification transmission module 220 may cooperate with notification server 130, which transmits the notification to a user device 120A-120Z. Either the notification transmission module 220 or the NSM component 132 of the notification server 130 may be responsible for deduping, combining, and/or invalidating notifications. Deduping may be based on one or more of a livestream video ID, a text conversation, if a user is watching the livestream video, or if an event is occurring.

In one implementation, the notification server 130 or NSM component 132 may store a record (e.g., in data store 160, in data store 122, etc.) of transmitted notifications including a notification transmitted to a second user device that the first user device is watching a livestream video. The notification server 130 or NSM component 132 may determine a subset of the transmitted notifications that were transmitted to a third user within a threshold amount of time (e.g., each of the subset of the transmitted notifications were transmitted within a five-minute period of time) and that correspond to one or more of the livestream video, the first user, or a text conversation corresponding to the notification. The notification server 130 or NSM component 132 may determine a new notification is to be transmitted to the third user, the new notification corresponding to the one or more of the livestream video, the first user, or the text conversation corresponding to the notification. The notification server 130 or NSM component 132 may combine the subset of the transmitted notifications with the new notification to generate an updated notification. The notification server 130 or NSM component 132 may determine the user has not dismissed the notification and has not already engaged with a similar notification (e.g., dismissed or accepted a notification for the same livestream video). The notification server 130 or NSM component 132 may transmit, to the selected set of contacts, the updated notification.

In one implementation, the media server 110 may transmit, over the network, the livestream video to a first user device to cause the livestream video to be presented via the first user device, to a first user. The media server 110 may select (based on affinity scores of contacts of the first user), from the contacts of the first user, a set of contacts with whom the livestream video is to be shared. The media server 110 may cause a transmission (via notification server 130 or NSM component 132), to the selected set of contacts, of a notification that at least the first user is watching the livestream video. The media server 110 may transmit, over the network, the livestream video to a second user device to cause the livestream video to be presented, via the second user device, to a second user. The media server 110 may select (e.g., based on second affinity scores of second contacts of the second user), from the second contacts of the second user, a third user with whom the livestream video is to be shared, where the third user is one of the selected set of contacts to whom the notification was previously sent. The media server 110 may invalidate the notification provided to the third user (e.g., the notification previously caused to be transmitted to the third user by the user). The media server 110 may dedupe (or cause to be deduped via notification server 130 or NSM component 132) the notification with a second notification that the second user is watching the livestream video. The media server 110 may provide (via notification server 130 or NSM component 132), to the third user, the deduped notification that the first user and the second user are watching the livestream video.

In one implementation, the media server 110 may determine the livestream video has ceased from being presented to the first user for more than a threshold amount of time. The media server 110 may transmit a push notification to the selected set of contacts, where the push notification invalidates a previous notification state (e.g., that the first user is watching the livestream video, that specific users are watching the livestream video, that a specific number of users are watching the livestream video) (the previous notification state may be stored in the data store 122) of the selected set of contacts and causes a new notification state to be displayed (e.g., an updated list of users that are watching the livestream video, an updated number of users that are watching the livestream video) on respective user devices of the selected set of contacts, where the push notification includes a timestamp.

Recipient component 128 may include a livestream video module 230, a notification receipt module 232, and an acceptance module 234.

The livestream video module 230 may receive a livestream video to present via the user device 200. The livestream video module 230 may present the livestream video via the user device 200 so that the user can watch the livestream video at the same point as other users (e.g., the user devices synchronize presenting the livestream video).

The notification receipt module 232 may receive a notification transmitted by the media server 110 or by a user device 120A-120Z. The notification may be an invitation to watch the livestream video. Notification receipt module 232 may display the notification in a graphical interface, which may be capable of receiving user input to accept the invitation (e.g., selecting a URL (e.g., corresponding to the livestream video) in the notification). The notification receipt module 232 of user device 200 may notify a user that is watching the livestream video that one or more contacts of the user are watching a livestream video (e.g., 5 contacts are watching the livestream video).

The acceptance module 234 may be coupled to the notification receipt module 232. Upon receipt of user input to accept the invitation in the notification, acceptance module 234 may transmit an acceptance 152 (see FIG. 1) to the media server 110, the media server may transmit the livestream video to the user device 200, and the livestream video module 230 may present the livestream video to the user via the user device 200.

Livestream video module 230 of a user device 200 may be presenting a livestream video hosted by a first platform (e.g., a content sharing platform, a platform with a media player, a media viewer, etc.) to a first user of user device 200. Conversation module 212 of user device 200 may determine the first user is in a text conversation with a second user via a second platform (e.g., a chat platform, a text conversation platform, etc.). The notification transmission module 220 of user device 200 may cause a notification (e.g., an invitation to watch the livestream video) that at least the first user is watching the livestream video to be sent to the second user. Acceptance module 234 of a second user device of the second user may transmit an acceptance 152 of the invitation (e.g., from the notification) to the media server 110 and livestream video module 230 of the second user device may receive the livestream video and present the livestream video to the second user on a user device of the first platform. The conversation module 212 of user device 200 and/or the second device may cause the text conversation between the first user and the second user to be continued on the user interface of the first platform. Continuing the conversation on the first platform may keep the first user and the second user engaged (e.g., encourage the user and the contact to continue the conversation and to continue watching the livestream).

The conversation module 212 of user device 200 and/or the second device may cause the text conversation to be continued on the user interface of the first platform by the first platform communicating with the second platform via an application program interface (API) to transfer the text conversation to the second platform or by communicating with an operating system (OS) to transfer the text conversation to the second platform.

Figure 3:
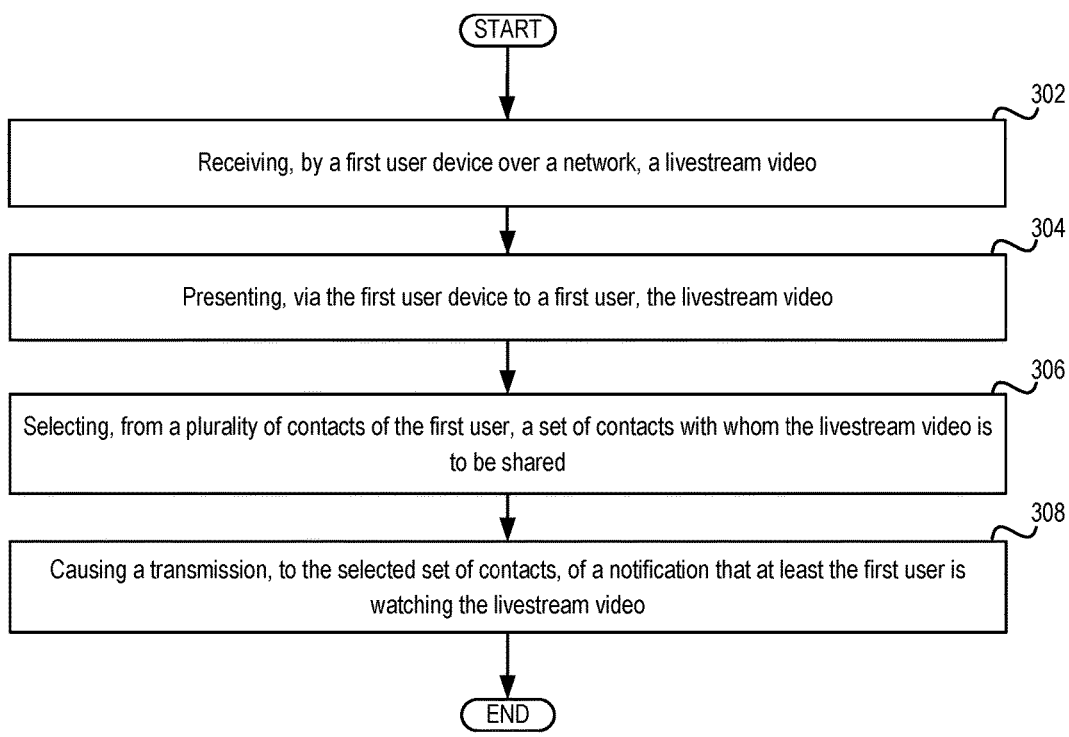
FIG. 3 is a flow diagram illustrating an example method of a first user device that causes transmission of a notification of a livestream video, in accordance with an implementation of the disclosure.
Figure 4:
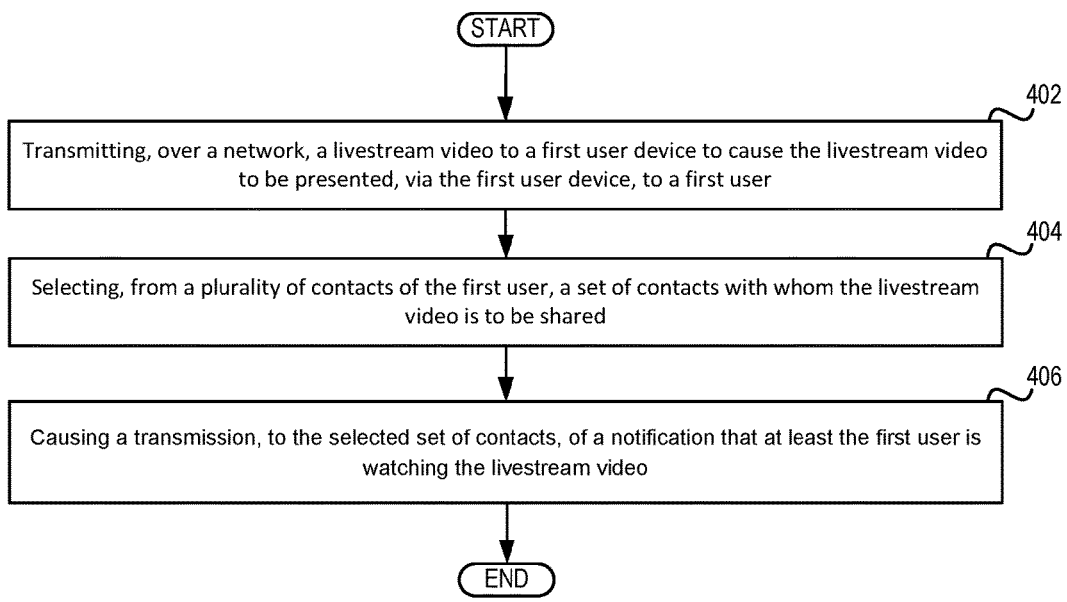
FIG. 4 is a flow diagram illustrating an example method of a media server that transmits a notification of a livestream video, in accordance with an implementation of the disclosure.
Figure 5:
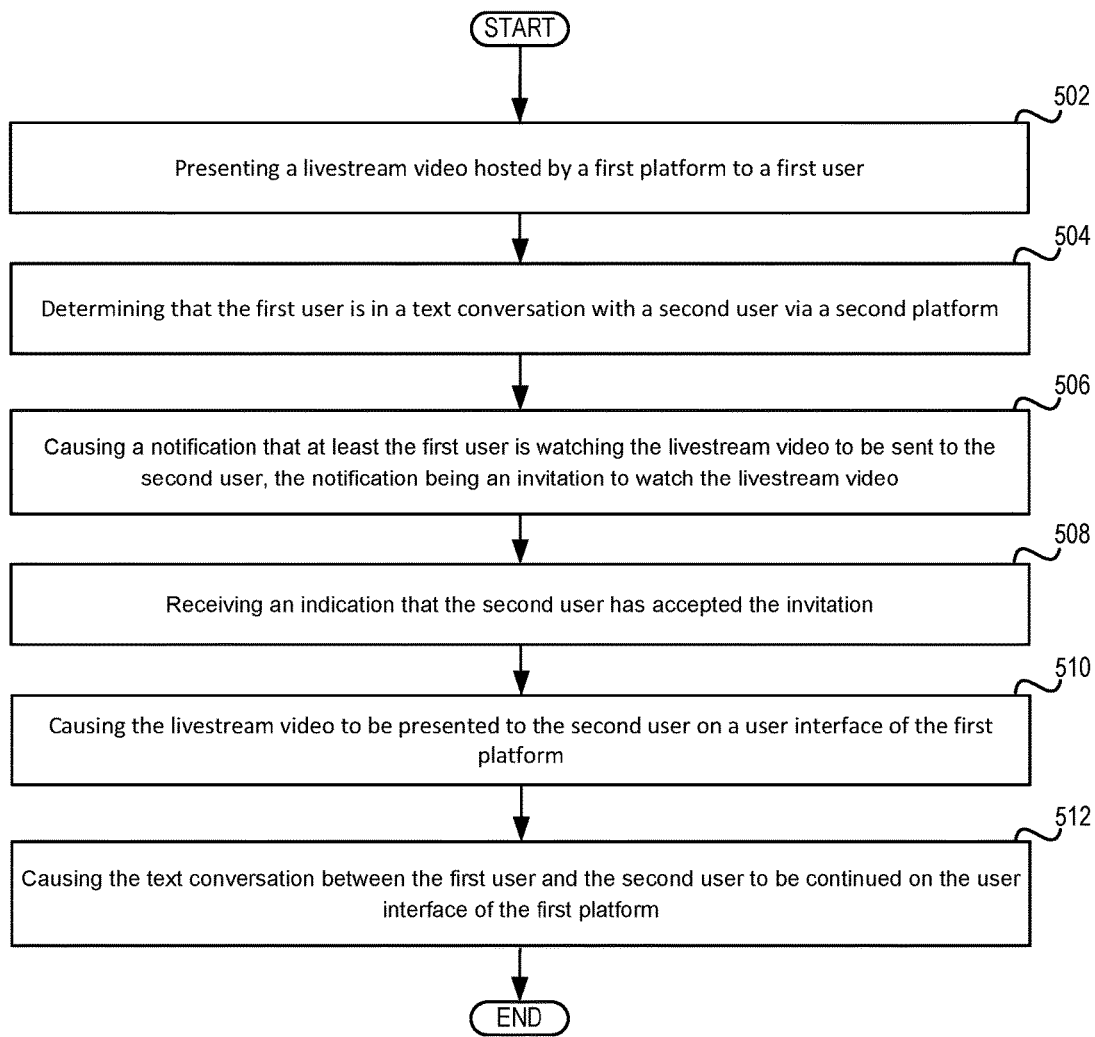
FIG. 5 is a flow diagram illustrating an example method of a first user device that causes transmission of a notification of a livestream video, in accordance with an implementation of the disclosure.

FIGS. 3-5 depict flow diagrams for illustrative examples of methods 300, 400, and 500 for implementing livestream notifications. Methods 300 and 500 are example methods from the perspective of the first user device and method 400 illustrates an example process flow from the perspective of a media server. Methods 300, 400, and 500 may be performed by processing devices that may include hardware (e.g., circuitry, dedicated logic), software (such as is run on a general purpose computer system or a dedicated machine), or a combination of both. Methods 300, 400 and 500 and each of their individual functions, routines, subroutines, or operations may be performed by one or more processors of the computer device executing the method. In certain implementations, methods 300, 400, and 500 may each be performed by a single processing thread. Alternatively, methods 300, 400, and 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 500 may be performed by user device 120 of FIG. 1 and method 400 may be performed by media server 110 of FIG. 1.

Referring to FIG. 3, method 300 may be performed by one or more processing devices of a first user device that causes transmission of a notification of a livestream video.

Method 300 may begin at block 302 where the processing device of a first user device may receive a livestream video over a network.

At block 304, the processing device may present the livestream video to a first user.

At block 306, the processing device may select, from contacts of the first user, a set of contacts with whom the livestream video is to be shared. The processing device may select based on affinity scores of the contacts. An affinity score may indicate how relevant the livestream video is for a corresponding contact of the contacts based on one or more of a relationship between the corresponding contact and the first user (e.g., increase affinity score for increased relationship), whether the corresponding contact and the first user are participants in a text conversation (e.g., increase affinity score if both are participants), content of the livestream video (e.g., increase affinity score if the corresponding contact has a high affinity for the content), whether the corresponding contact is viewing the livestream video (e.g., the user is not to transmit a notification to a corresponding contact that is watching the livestream video), or whether the corresponding contact is online (e.g., the user is not to transmit a notification to a corresponding contact that is not online). One or more affinity scores may indicate how relevant the livestream video is for a corresponding contact of the contacts, the one or more affinity scores may be represented by a binary values, and the binary values may be combined into a score and compared against a threshold value to determine how relevant the livestream video is for the corresponding contact.

At block 308, the processing device may cause a transmission, to the selected set of contacts, of a notification that at least the first user is watching the livestream video. The processing device may cause the transmission of the notification after the first user has watched the livestream video for a threshold amount of time (e.g., 10-30 seconds). In one implementation, the processing device transmits the notification to the selected set of contacts. Alternatively, the processing device provides the notification to the notification server 130, which manages user notifications and transmits them to user devices as discussed in more details herein.

Referring to FIG. 4, method 400 may be performed by one or more processing devices of a media server and may begin at block 402. At block 402, the processing device of the media server may transmit, over a network, a livestream video to a first user device to cause the livestream video to be presented, via the first user device, to a first user.

At block 404, the processing device selects, from contacts of the first user, a set of contacts with whom the livestream video is to be shared. The processing device may select the set of contacts based on affinity scores of the contacts as described above.

At block 406, the processing device causes transmission, to the selected set of contacts, of a notification that at least the first user is watching the livestream video. In one implementation, the processing device transmits the notification to the selected set of contacts. Alternatively, the processing device provides the notification to the notification server 130, which manages user notifications and transmits them to user devices as discussed in more details herein.

Responsive to ceasing from presenting the livestream video to the first user and subsequently presenting the livestream video to the first user within a threshold amount of time of the ceasing (e.g., less than three hours between leaving the livestream video and returning to the livestream video), an additional notification that the at least the first user is watching the livestream video may not be transmitted to the selected set of contacts.

Method 400 may further include transmitting, over the network, the livestream video to a second user device to cause the livestream video to be presented, via the second user device, to a second user, selecting, from second contacts of the second user, a third user with whom the livestream video is to be shared, the selecting being based on second affinity scores of the third user, where the third user is one of the selected set of contacts to whom the notification was previously provided, invalidating the notification provided to the third user, deduping the notification with a second notification that the second user is watching the livestream video, and providing, to the third user, the deduped notification that the first user and the second user are watching the livestream video.

Method 400 may further include storing a record of transmitted notifications including the notification, determining a subset of the transmitted notifications that were transmitted to a third user within a threshold amount of time and that correspond to one or more of the livestream video, the first user, or a conversation corresponding to the notification, determining a new notification is to be transmitted to the third user, the new notification corresponding to the one or more of the livestream video, the first user, or the conversation corresponding to the notification, combining the subset of the transmitted notifications with the new notification to generate an updated notification, determining the user has not dismissed the notification and has not already engaged with a similar notification, and providing, to the selected set of contacts, the updated notification.

Method 400 may further include determining the livestream video has ceased from being presented to the first user for more than a threshold amount of time and providing a push notification (e.g., including a timestamp) to the selected set of contacts, where the push notification invalidates a previous notification state of the selected set of contacts and causes a new notification state to be displayed on respective user devices of the selected set of contacts. The user device may determine which push notification to display based on the timestamp of each push notification.

Referring to FIG. 5, method 500 may be performed by one or more processing devices of a first user device that causes transmission of a notification of a livestream video.

Method 500 may begin at block 502 where the processing device of a first user device presents a livestream video hosted by a first platform to a first user.

At block 504, the processing device may determine that the first user is in a text conversation with a second user via a second platform.

At block 506, the processing device may cause a notification that at least the first user is watching the livestream video to be sent to the second user. The notification may be an invitation to watch the livestream video. The second user device may display the notification via a user interface. The user interface is discussed in more detail in regards to FIG. 6.

At block 508, the processing device receives an indication that the second user has accepted the invitation.

At block 510, the processing device causes the livestream video to be presented to the second user on a user interface of the first platform.

At block 512, the processing device causes the text conversation between the first user and the second user to be continued on the user interface of the first platform. The processing device may cause the conversation to be continued on the user interface of the first platform by obtaining contents of the text conversation via an application program interface (API) with the second platform. The processing device may cause the conversation to be continued on the user interface of the first platform by obtaining contents of the text conversation via an operating system (OS) of a user device of the first user.

Figure 6:
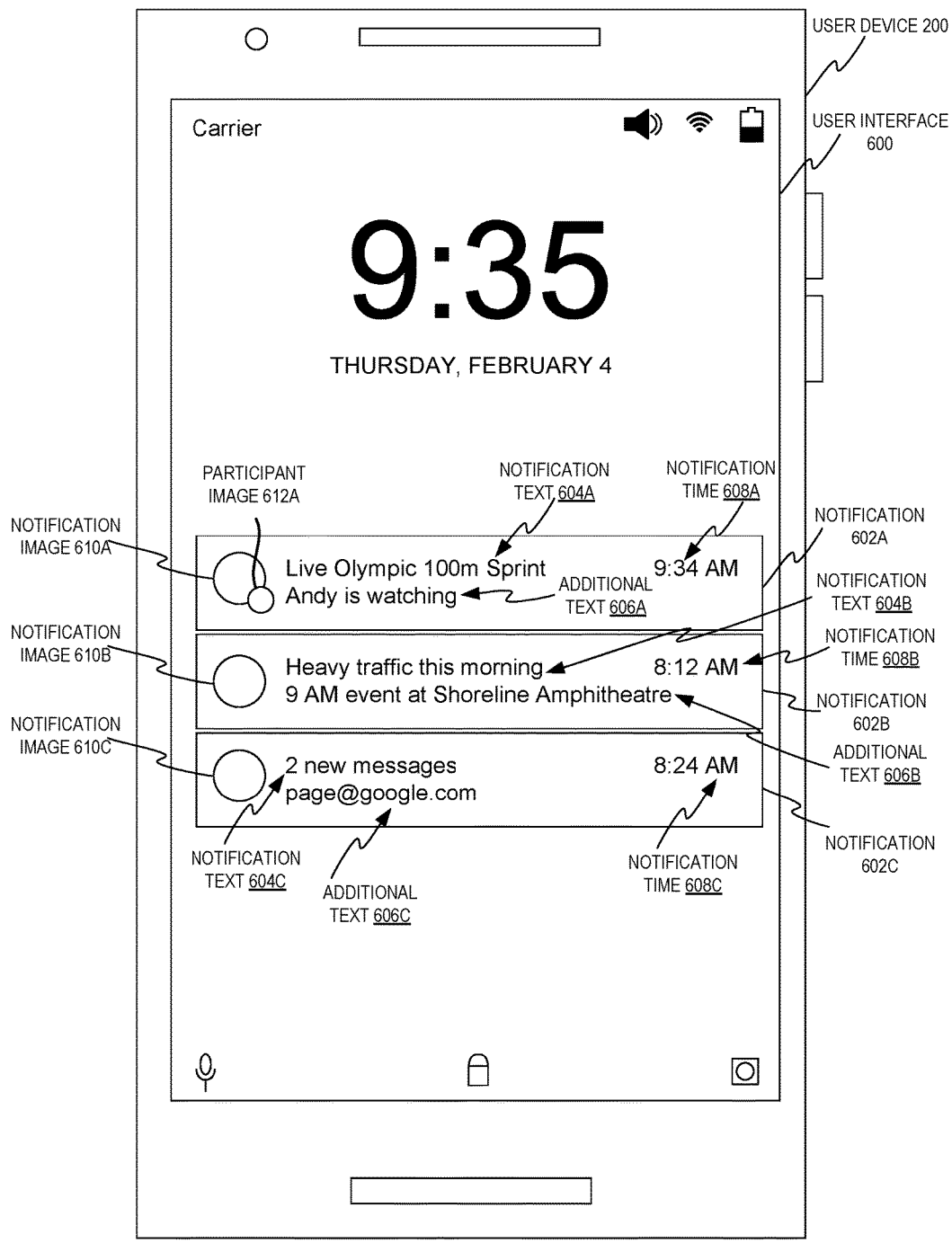
FIG. 6 is an example graphical interface for a user device that received a notification of a livestream video, in accordance with an implementation of the disclosure.

FIG. 6 illustrates an example graphical interface for a user device that received a notification of a livestream video.

Referring to FIG. 6, a user device 200 may display a user interface 600. The user interface 600 displays notifications 602A-602C (hereinafter notification 602). Each notification 602 may include one or more of a graphical, textual, audio, video, tactile, or other component. Each notification 602 may display one or more of notification text 604, additional text 606, notification time 608, notification image 610, and participant image 612. Each notification 602 may be one or more of a notification of a livestream video, a travel alert, an email alert, etc. Notification 602A may be a notification of a livestream video corresponding to a live event. The notification text 604A may give a description of the livestream video (e.g., "Live Olympic 100 m Sprint"), the additional text 606A may indicate which contacts of the user of user device 200 are watching the livestream video (e.g., "Andy is watching"), the notification time 608A may indicate when the notification 602A was sent (e.g., 9:34 AM), notification image 610A may display an image corresponding to the livestream video (e.g., an image of the Olympic rings), and the participant image 612A may show an image of one or more of the contacts that are watching the livestream video (e.g., an image of Andy, a user profile image of Andy from the conversation platform or the content sharing platform).

In one implementation, a user is watching a livestream video and the media server 110 determines one or more of the contacts of the user are also watching the livestream video. The media server 110 may cause a notification 602 to be transmitted to the user that the one or more contacts are watching the livestream video. The notification 602 may include additional text 606 listing the names of the one or more contacts (e.g., "Andy, Bill, and Catherine are watching") or a number of the one or more contacts (e.g., "Three contacts are watching") and participant image 612 (e.g., images of the one or more contacts (e.g., Andy, Bill, and Catherine), an image of the number of the one or more contacts (e.g., 3), etc.). In response to one of the contacts ceasing from watching the livestream video (e.g., for more than a threshold amount of time, more than 30 seconds), the notification 602 may be invalidated and an updated notification 602 may be displayed on the user interface 600 with updated additional text 606 (e.g., "Andy and Bill are watching," "Two contacts are watching," etc.) and updated participant image 612 (e.g., images of Andy and Bill, an image of the number 2, etc.)

In one implementation, a second user is not watching the livestream video via a second device. Two or more contacts of the second user begin watching the livestream video, which can result in two or more notifications of the same livestream video being transmitted to the same second device (e.g., based on an affinity score of the second user). In some implementations, the notification server 120 dedupes and combines the notifications into one notification 602 and transmits the notification 602 to the second device. In response to one of the two or more contacts stopping watching the livestream video, the notification 602 transmitted to the second device is invalidated, and an updated notification of the remaining users that are watching the livestream video is presented.

A notification synchronizing mechanism (NSM) component 132 may be a server-side mechanism of the notification server 132 and the NSM component 132 may keep track of the notifications 602 sent to a user device 200. A general-purpose distributed memory caching system (e.g., Memcached) may layer notifications 602 sent into RAM (e.g., store a copy of notifications 602 in a transitory cache, store a copy of notifications 602 in a memcache layer) before falling back on a slower backing store, such as a database (e.g., data store 160). When a new notification is intended to be sent to the user device 200, the new notification may first be sent to the NSM component 132. The NSM component 132 may then look up similar notifications recently sent to the user device 200 which correspond to one or more of the same livestream video, the same contacts, or the same conversation. The NSM component 132 may then combine the pre-existing notifications 602 with the new notification, store the new notification state in the transitory cache (e.g., memcache layer), and then transmit an updated state to the user device 200. Upon receipt of the updated state, the user device 200 may update the displayed notification state if the user of user device 200 has not already dismissed the previous notification. The NSM component 132 may also consult a session tracker (a session tracker may include a watch history (what the user is currently watching, what the user has watched), a notification history (notifications received, user response to notifications received, livestream videos to which the notifications received correspond, etc.) of the user device 200 to determine whether the user is already watching the livestream video prescribed in the intended notification 602 or if the user of user device 200 has already engaged with a similar notification (e.g., the user has already accepted or rejected a previous notification inviting the user to watch the same livestream video as the intended notification 602). The intended notification 602 may not be transmitted to the user device 200 if the user has already dismissed the notification 602, the user is already watching the livestream video, or if the user has already engaged with a similar notification. In one implementation, the notification receipt module 232 may receive the notification 602 and store a copy of the notification in the notification cache 123. When new notifications are to be sent to the user device 200, the notification receipt module 232 may look up similar notifications recently sent to the user device 200 and combine (e.g. dedupe) the pre-existing notifications 602 with the new notification, store the new notification state in the notification cache 123, and transmit an updated state to the user device 200.

In another implementation, a notification 602 may be invalidated in response to a user stopping watching the livestream video corresponding to the notification 602. In the case of a deduped livestream notification that features multiple users, a single user (e.g., the user that stopped watching the livestream video) may be removed from the notification 602 by using a push notification to the client device of the recipient user. The push notification may invalidate the previous notification state of the client device of the recipient user and may transmit a new notification state to the client device of the recipient user. The push notification may include a timestamp for the creation time of the push notification so that if multiple invalidation timestamps are sent to the client device of the recipient user and if the client device receives the invalidation timestamps out of order, race conditions can be avoided that would show the recipient stale data (e.g., the push notification with the most recent timestamp will be displayed even if push notifications (with a less recent timestamps) are received after the push notification with the most recent timestamp).

A user may dismiss one or more notifications 602 from the user interface by providing some input (e.g., swiping the notification to the left, selecting a close or dismiss option in the notification, etc.). A user may accept one or more notifications by providing some input (e.g., swiping the notification to the right, selecting a link to the livestream video or an accept option in the notification, etc.). In response to the user dismissing or accepting a notification 602, the notification 602 may not be updated, deduped, combined, or invalidated. If the user has not dismissed or accepted the notification 602, the notification 602 may be invalidated and replaced by an updated, deduped, or combined notification.

Figure 7:
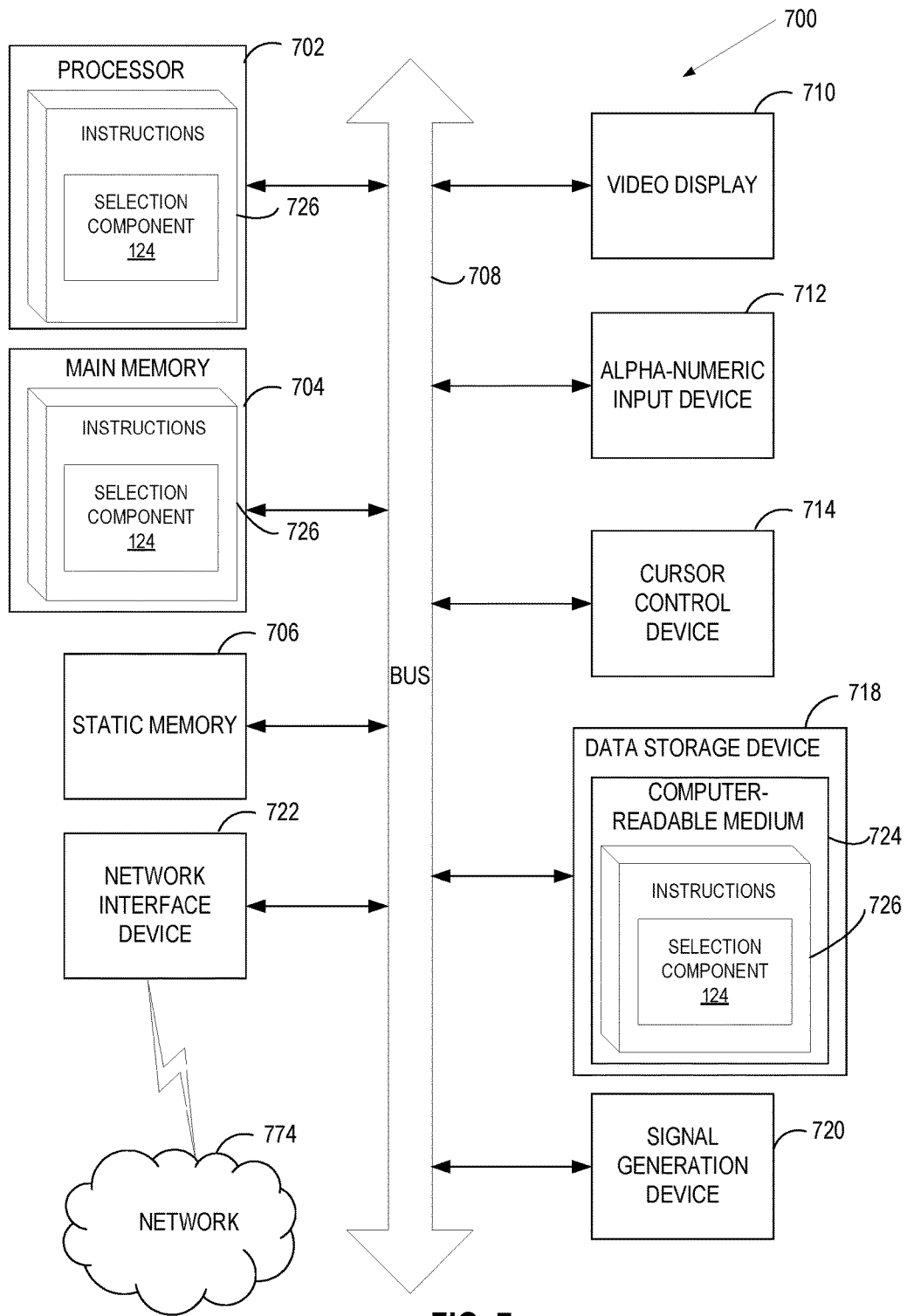
FIG. 7 is a block diagram illustrating one implementation of a computer system, in accordance with an implementation of the disclosure.

FIG. 7 depicts a block diagram of a computer system operating in accordance with one or more aspects of the present disclosure. In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions encoding selection component 124 of FIG. 2 and for implementing methods 300, 400, or 500.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "receiving," "presenting," "selecting," "causing," "transmitting," "invalidating," "deduping," "storing," "combining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, 400, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, via a first user device over a network, a livestream video;
   presenting, via the first user device to a first user, the livestream video;
   selecting a second user with whom the livestream video is to be shared, the livestream video being livestreamed by a third user device, the selecting being based on relevance of content of the livestream video to the second user, wherein the relevance of the content to the second user is based on one or more previous interactions by the second user with one or more content items that are similar to the content of the livestream video; and
   causing a transmission, to a second user device of the second user, of a notification that at least the first user is watching the livestream video that is being livestreamed by the third user device.

2. The method of claim 1, wherein the second user is selected from a plurality of contacts of the first user, wherein the selecting is further based on affinity scores of the plurality of contacts.

3. The method of claim 2, wherein an affinity score indicates how relevant the livestream video is for a corresponding contact of the plurality of contacts based on a relationship between the corresponding contact and the first user.

4. The method of claim 2, wherein an affinity score indicates how relevant the livestream video is for a corresponding contact of the plurality of contacts based on whether the corresponding contact is viewing the livestream video.

5. The method of claim 2, wherein an affinity score indicates how relevant the livestream video is for a corresponding contact of the plurality of contacts based on whether the corresponding contact is online.

6. The method of claim 2, wherein:
one or more affinity scores indicate how relevant the livestream video is for a corresponding contact of the plurality of contacts; the one or more affinity scores are represented by a binary values; and
the binary values are combined into a score and compared against a threshold value to determine how relevant the livestream video is for the corresponding contact.

7. The method of claim 1, wherein the causing of the transmission of the notification is after the first user has watched the livestream video for a threshold amount of time.

8. A non-transitory machine-readable storage medium storing instructions which, when executed cause a processing device to perform operations comprising:
transmitting, over a network, a livestream video to a first user device to cause the livestream video to be presented, via the first user device, to a first user;
selecting a second user with whom the livestream video is to be shared, the livestream video being livestreamed by a third user device, the selecting being based on relevance of content of the livestream video to the second user, wherein the relevance of the content to the second user is based on one or more previous interactions by the second user with one or more content items that are similar to the content of the livestream video; and
causing a transmission, to a second user device of the second user, of a notification that at least the first user is watching the livestream video that is being livestreamed by the third user device.

9. The non-transitory machine-readable storage medium of claim 8, wherein the second user is selected from a plurality of contacts of the first user, wherein the selecting is further based on affinity scores of the plurality of contacts.

10. The non-transitory machine-readable storage medium of claim 9, wherein an affinity score indicates how relevant the livestream video is for a corresponding contact of the plurality of contacts based on a relationship between the corresponding contact and the first user.

11. The non-transitory machine-readable storage medium of claim 9, wherein an affinity score indicates how relevant the livestream video is for a corresponding contact of the plurality of contacts based on one or more of:
whether the corresponding contact is viewing the livestream video; or
whether the corresponding contact is online.

12. The non-transitory machine-readable storage medium of claim 9, wherein:
one or more affinity scores indicate how relevant the livestream video is for a corresponding contact of the plurality of contacts; the one or more affinity scores are represented by a binary values; and
the binary values are combined into a score and compared against a threshold value to determine how relevant the livestream video is for the corresponding contact.

13. The non-transitory machine-readable storage medium of claim 9, the operations further comprising:
transmitting, over the network, the livestream video to a fourth user device to cause the livestream video to be presented, via the fourth user device, to a fourth user;
selecting, from a second plurality of contacts of the fourth user, the second user with whom the livestream video is to be shared, the selecting being based on second affinity scores of the second user;
invalidating the notification provided to the second user;
deduping the notification with a second notification that the fourth user is watching the livestream video; and
providing, to the second user, the deduped notification that the first user and the fourth user are watching the livestream video.

14. The non-transitory machine-readable storage medium of claim 9, the operations further comprising:
storing a record of transmitted notifications comprising the notification;
determining a subset of the transmitted notifications that were transmitted to a fourth user within a threshold amount of time and that correspond to one or more of the livestream video or the first user;
determining a new notification is to be transmitted to the fourth user, the new notification corresponding to the one or more of the livestream video or the first user;
combining the subset of the transmitted notifications with the new notification to generate an updated notification;
determining the fourth user has not dismissed the notification and has not already engaged with a similar notification; and
providing, to the fourth user, the updated notification.

15. The non-transitory machine-readable storage medium of claim 9, the operations further comprising:
determining the livestream video has ceased from being presented to the first user for more than a threshold amount of time; and
providing a push notification to the second user, wherein the push notification invalidates a previous notification state of the second user and causes a new notification state to be displayed on the second user device, wherein the push notification comprises a timestamp.

16. The non-transitory machine-readable storage medium of claim 8, wherein the operations further comprise determining the first user has watched the livestream video for a threshold amount of time, wherein the notification is caused to be transmitted subsequent to the determining the first user has watched the livestream video for the threshold amount of time.

17. The non-transitory machine-readable storage medium of claim 8, the operations further comprising:
responsive to ceasing from presenting the livestream video to the first user and subsequently presenting the livestream video to the first user within a threshold amount of time of the ceasing, refraining from providing, to the second user, an additional notification that the at least the first user is watching the livestream video.

18. A method comprising:
presenting a livestream video hosted by a first platform via a first user device to a first user;
selecting a second user with whom the livestream video is to be shared, the livestream video being livestreamed by a third user device, the selecting being based on relevance of content of the livestream video to the second user, wherein the relevance of the content to the second user is based on one or more previous interactions by the second user with one or more content items that are similar to the content of the livestream video;
causing a notification that at least the first user is watching the livestream video to be sent to a second user device of the second user, wherein the notification is an invitation to watch the livestream video that is being livestreamed by the third user device; and
upon receiving an indication that the second user has accepted the invitation, causing the livestream video that is being livestreamed by the third user device to be presented to the second user on a user interface of the first platform.

19. The method of claim 18, wherein the second user is selected from a plurality of contacts of the first user, wherein the selecting is further based on affinity scores of the plurality of contacts.

20. The method of claim 19, wherein an affinity score indicates how relevant the livestream video is for a corresponding contact of the plurality of contacts based on a relationship between the corresponding contact and the first user.

* * * * *